United States Patent [19]
Zander

[11] Patent Number: 5,530,506
[45] Date of Patent: Jun. 25, 1996

[54] FILM TAKE-UP DEVICE IN CAMERA

[75] Inventor: Dennis R. Zander, Penfield, N.Y.

[73] Assignee: Eastman Kodak Company, Rochester, N.Y.

[21] Appl. No.: 370,131

[22] Filed: Jan. 9, 1995

[51] Int. Cl.⁶ .................................... G03B 1/00
[52] U.S. Cl. ................................................. 354/212
[58] Field of Search ............................ 354/212; 352/157, 352/158

[56] References Cited

U.S. PATENT DOCUMENTS

| | | | |
|---|---|---|---|
| 2,792,185 | 5/1957 | Julliard | 242/74 |
| 3,756,528 | 9/1973 | Ohmura | 242/74 |
| 4,113,192 | 9/1978 | Osanai | 242/1 |

FOREIGN PATENT DOCUMENTS

| | | | |
|---|---|---|---|
| 2-250051 | 10/1990 | Japan | G03C 3/00 |
| 1110057 | 4/1968 | United Kingdom | G03B 1/02 |

*Primary Examiner*—Monroe H. Hayes
*Attorney, Agent, or Firm*—Roger A. Fields

[57] ABSTRACT

In a camera, a snag-and-drag web has one end portion secured to a take-up spool and an opposite free end portion provided with an integral hook. The web's free end portion initially protrudes into a cartridge-receiving chamber to be bent when a film cartridge with a projecting film leader is loaded into the chamber, to make the hook extend away from the free end portion to engage the film leader. Rotation of the take-up spool then winds the snag-and-drag web onto the spool to move the hook to draw the film leader from the film cartridge and onto the spool.

5 Claims, 2 Drawing Sheets

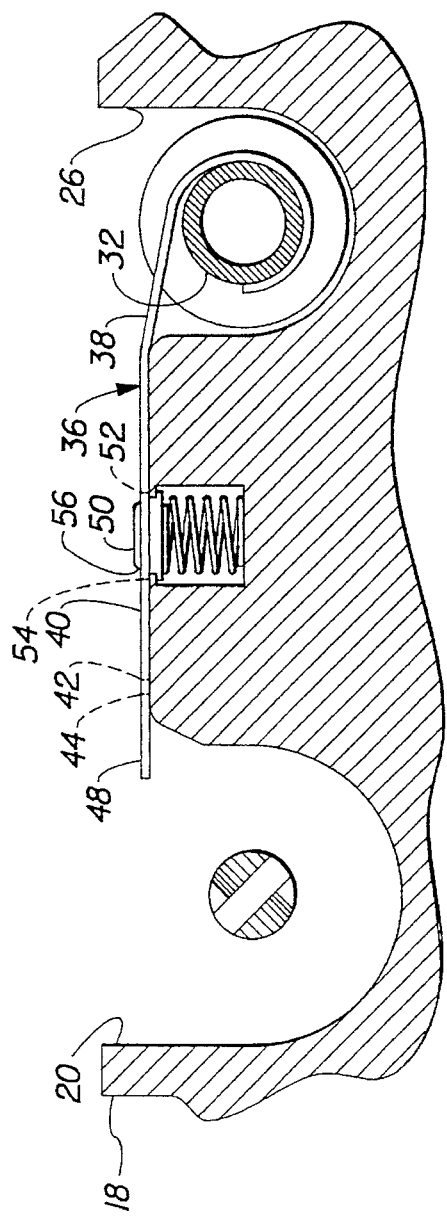
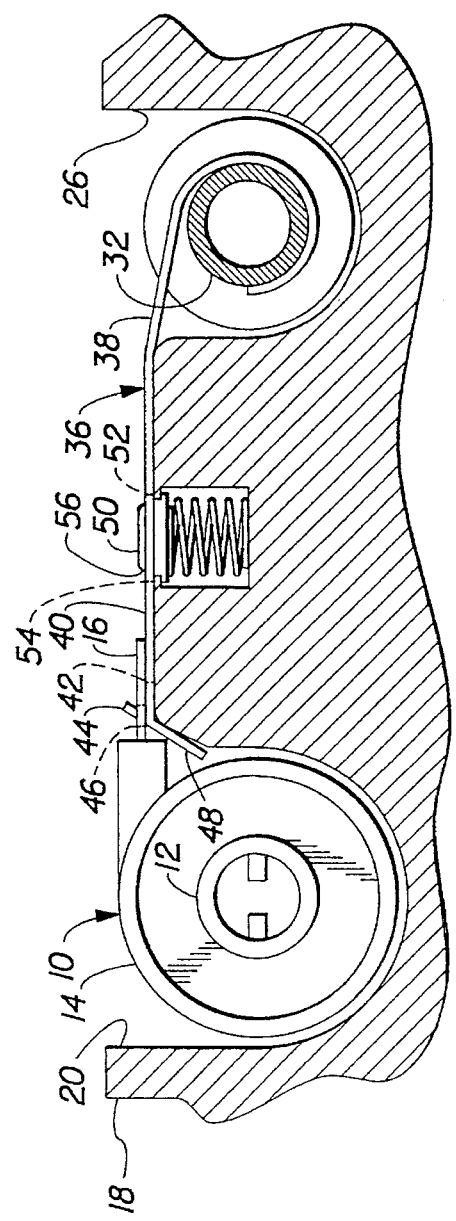

FILM TAKE-UP DEVICE IN CAMERA

CROSS-REFERENCE TO RELATED APPLICATION

Reference is made to commonly assigned copending application Ser. No. 370,142 [our Docket No. 69463], entitled FILM TAKE-UP DEVICE IN CAMERA and filed Jan. 9, 1995 in the name of Dennis R. Zander, assigned to the assignee of this application.

FIELD OF THE INVENTION

The invention relates generally to the field of photography, and in particular to a film take-up device in a camera.

BACKGROUND OF THE INVENTION

It is known for a camera to include a snag-and-drag web which has one end portion secured to a take-up spool and an opposite free end portion provided with a hook or the like for engaging a film leader of a rolled filmstrip placed in a supply chamber. The web is flexible to permit it to be wrapped about the take-up spool to draw the film leader onto the spool when the spool is windingly rotated, to position the first available frame of the filmstrip for exposure. For example, see British Patent Specification 1,110,057, published Apr. 18, 1968 (Application No. 18086/65, filed Apr. 28, 1965).

Typically, there is some difficulty in positioning the hook to ensure it will engage the film leader.

SUMMARY OF THE INVENTION

A camera comprising a snag-and-drag web which has one end portion secured to a take-up spool and an opposite end portion provided with snag means for engaging a film leader of a rolled filmstrip placed in a supply chamber and which is flexible to permit it to be wrapped about the take-up spool to draw the engaged leader onto the take-up spool when the take-up spool is windingly rotated, is characterized in that:

the snag means is supported to extend away from the opposite end portion of the web to form a drag hook for engaging the film leader, in response to bending the opposite end portion; and the opposite end portion of the web initially protrudes into the supply chamber to be bent when a rolled filmstrip is placed in the supply chamber, to make the snag means extend away from the opposite end portion and position the drag hook to engage the film leader.

BRIEF DESCRIPTION OF THE DRAWINGS

FIGS. 2 and 3 are schematic sectional views depicting operation of the snag-and-drag web.

DETAILED DESCRIPTION OF THE INVENTION

Figure 1:
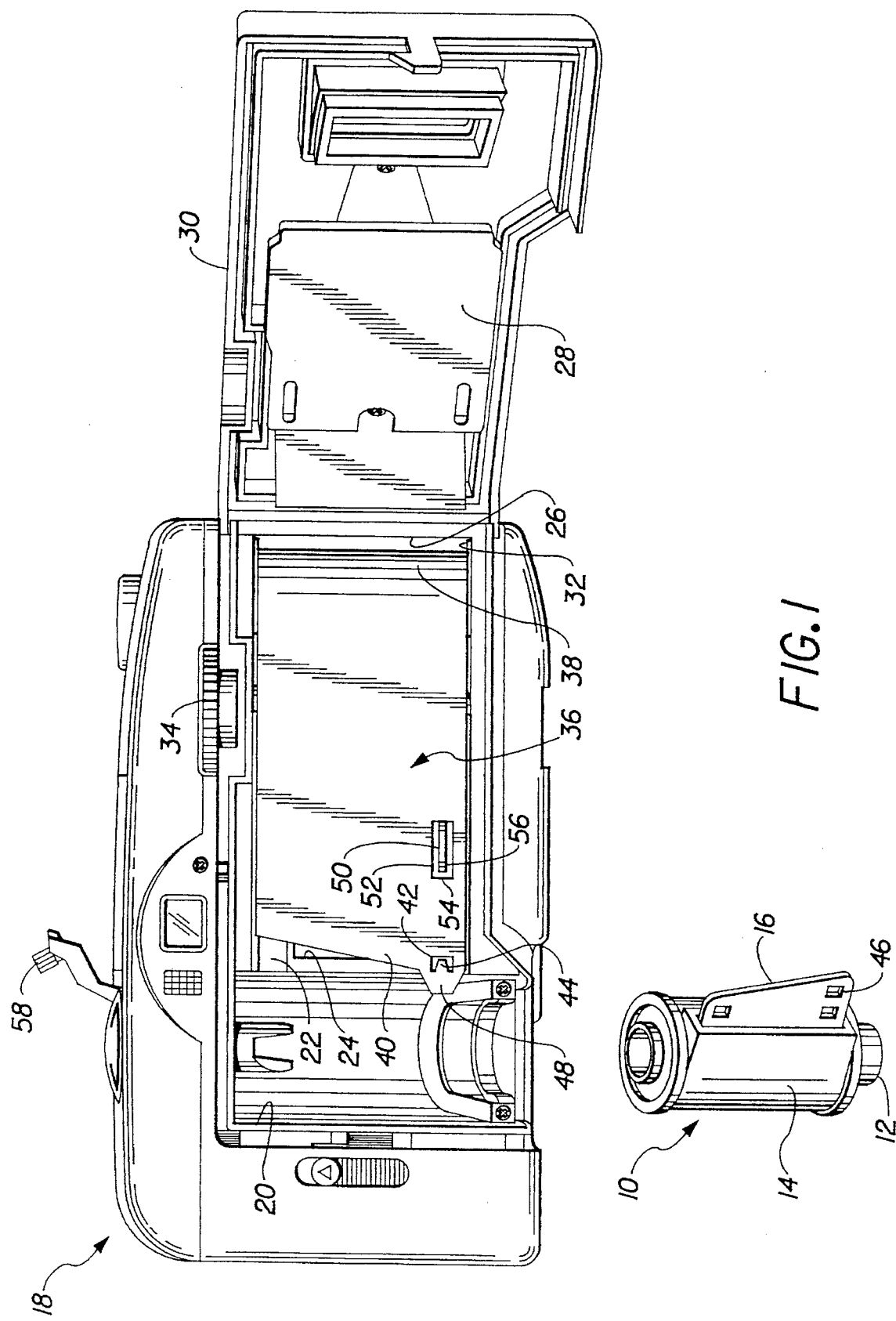
FIG. 1 is a rear elevation view of a camera including a film snag-and-drag web according to a preferred embodiment of the invention.

The invention is disclosed as being embodied preferably in a still-picture camera. Because the features of the camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIG. 1 shows a 35 mm film cartridge 10 containing a rolled filmstrip on a flanged supply spool 12 rotatably supported inside the cartridge housing 14. A relatively short film leader 16 of the filmstrip projects from an exterior end of a film egress/ingress slit in the cartridge housing 14.

As shown in FIG. 1, a camera 18 intended to be used with the film cartridge 10 comprises a film supply chamber 20 for receiving the film cartridge, a pair of parallel film rails 22 for supporting the filmstrip beginning with the film leader 16, a back frame opening 24 at which successive frames of the filmstrip are exposed, a film take-up chamber 26, and a pressure plate 28 located on a rear door 30 for holding successive frames of the filmstrip flat over the back frame opening during exposure. A film take-up spool or drum 32 is rotatably supported in the film take-up chamber 26 and is manually rotated in a winding direction via a thumbwheel 34. The take-up spool 32 is rotated in the winding direction after each exposure to wind the exposed frame of the filmstrip onto the spool.

A resilient flexible snag-and drag web 36 has one end portion 38 connected to the take-up spool 32 via known means, such as a staple or a tape, and an opposite free end portion 40. The free end portion 40 has a cut-out 42 which defines an integral drag hook or tooth 44 that lies in the same plane as the free end portion when the free end portion is not bent and extends away from the free end portion, i.e. out of the plane, when the free end portion is bent. See FIGS. 1–3. Bending the free end portion 40 as shown in FIG. 3 to extend the hook 44 away from the free end portion permits the hook to engage the film leader 16 at a perforation 46 in the leader.

Since a forward-most section 48 of the free end portion 40 of the web 36 initially protrudes into the supply chamber 20 as shown in FIG. 2, it will be bent beneath the film cartridge 10 when the film cartridge is placed in the supply chamber as shown in FIG. 3. Consequently, the hook 44 will be extended away from the free end portion 40 to position the hook to engage the film leader 16 at the perforation 46 in the film leader. The hook 44 may actually enter the perforation 46 to effect the engagement or it may be located immediately behind the perforation in position for engagement, depending on the extent to which the film leader 16 projects from the film cartridge 10.

A holding catch 50 is depressibly supported between the back frame opening 24 and the take-up chamber 26, and is spring-urged to enter a slot 52 in the one end portion 38 of the web 36 to maintain the web stationary. See FIGS. 1–3.

When the take-up spool 32 is rotated in a winding direction, the web 36 is drawn onto the spool, causing a perimeter edge 54 of the slot 52 moving against an inclined edge 56 of the catch 50 to cam the catch out of the slot by depressing the catch. Moreover, the hook 44 in engagement with the film leader 16 at the perforation 46 draws the film leader from the film cartridge 10 and onto the take-up spool 32. The film leader 16 is wound over the free end portion 40 of the web 36, and the hook 44 remains in engagement with the film leader.

After the last available frame of the filmstrip is exposed and wound onto the take-up spool 32, a return lever 58 in engagement with the supply spool 12 of the film cartridge 10 is rotated in a winding direction to similarly rotate the supply spool to return the filmstrip to the cartridge housing 14. Consequently, the web 36 (except for a trailing-most section of its one end portion 38) is drawn off the take-up spool 32 to locate the forward-most section 48 of its free end portion 40 in the supply chamber 20 beneath the film cartridge 10. Also, the catch 50 re-enters the slot 52 to hold the web 36 stationary to allow the film leader 16 to be disengaged from the hook 44 and drawn into the cartridge housing 14.

The invention has been described with reference to a preferred embodiment. However, it will be appreciated that variations and modifications can be effected by a person of ordinary skill in the art without departing from the scope of the invention. For example, the hook 44 can be configured to extend substantially parallel to the free end portion 40 of the web 36 when the free end portion is not bent, rather than lie in the same plane as the free end portion, and to extend at an acute angle with respect to the free end portion when the free end portion is bent. Also, more than one hook can be employed.

PARTS LIST 10. film cartridge
12. cartridge spool
14. cartridge housing
16. film leader
18. camera
20. supply chamber
22. film rails
24. back frame opening
26. take-up chamber
28. pressure plate
30. rear door
32. take-up spool
34. thumbwheel
36. snag-and-drag web
38. web end portion
40. opposite end portion
42. cut-out
44. hook
46. leader perforation
48. forward-most web section
50. holding catch
52. web slot
54. slot edge
56. catch edge
58. return lever

I claim:

1. A camera comprising a snag-and-drag web which has one end portion secured to a take-up spool and an opposite end portion provided with snag means for engaging a film leader projecting from a film cartridge placed in a cartridge-receiving chamber and which is flexible to permit it to be wrapped about said take-up spool to draw the film leader onto the take-up spool when the take-up spool is windingly rotated, is characterized in that:

said snag means is supported to extend away from said opposite end portion of the web when the opposite end portion is bent, to form a drag hook for engaging the film leader; and said opposite end portion of the web initially protrudes into said cartridge-receiving chamber in position to be bent by the film cartridge as the film cartridge is placed in the chamber, to make said snag means extend away from the opposite end portion to form said drag hook to engage the projecting film leader.

2. A camera as recited in claim 1, wherein said snag means is partially surrounded by a cut-out in said opposite end portion of the web to lie substantially in the same plane as the opposite end portion when the opposite end portion is not bent and to extend away from the opposite end portion when it is bent.

3. A camera as recited in claim 1, wherein said web has a slot, and a holding catch extends into said slot when said opposite end portion of the web protrudes into said supply chamber but is supported to be retracted out of the slot when the web is moved to be wrapped about said take-up spool.

4. A camera as recited in claim 3, wherein said holding catch has an inclined edge in contact with a perimeter edge of said slot to permit said web to cam the holding catch out of the slot when the web is moved to be wrapped about said take-up spool.

5. A camera as recited in claim 1, wherein return means winds the film leader into the film cartridge, said web has a slot, and a holding catch extends into said slot to prevent said opposite end portion of the web from being pulled into the film cartridge when the film leader is wound into the film cartridge but is supported to be retracted out of the slot when the web is moved to be wrapped about said take-up spool.

* * * * *